(12) United States Patent
Moon et al.

(10) Patent No.: US 7,396,138 B2
(45) Date of Patent: Jul. 8, 2008

(54) VIBRATION TYPE TILTING DEVICE

(75) Inventors: Yang-Ho Moon, Ansan-si (KR);
Chil-Sung Lee, Suwon-si (KR);
Dong-Won Choi, Suwon-si (KR);
Jae-Kyung Kim, Ansan-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 49 days.

(21) Appl. No.: 11/472,393

(22) Filed: Jun. 22, 2006

(65) Prior Publication Data

US 2006/0291080 A1    Dec. 28, 2006

(30) Foreign Application Priority Data

Jun. 24, 2005    (KR)    ............... 10-2005-0055027

(51) Int. Cl.
*G02B 7/182* (2006.01)
(52) U.S. Cl. .................................. 359/871
(58) Field of Classification Search ......... 359/223–226, 359/871
See application file for complete search history.

(56) References Cited

U.S. PATENT DOCUMENTS 6,188,502 B1 *   2/2001   Aoki ..................... 359/198

FOREIGN PATENT DOCUMENTS

KR    10-2004-101097    12/2004

OTHER PUBLICATIONS

Korean Patent Office Action, mailed Nov. 8, 2006, and issued in priority Korean Patent Application No. 10-2005-0055027.

* cited by examiner

*Primary Examiner*—Euncha P Cherry

(57) ABSTRACT

A tilting device for repeatedly tilting light reflected from a micro-mirror panel is disclosed. A vibration type tilting device, comprising a mirror positioned on a light path which reflects light transmitted from a digital micro-mirror panel, a mirror holder having the mirror joined to a side thereof, a coil joined to the reverse side of the mirror holder, and a magnet which generates a magnetic field passing through the coil, where portions of the mirror holder are removed to decrease the mass moment of inertia of the mirror holder, may not only provide a smooth and natural display by periodically tilting light reflected from a digital micro-mirror panel in constant time intervals but also may improve the tracking ability of the mirror and reduce residual vibration.

10 Claims, 9 Drawing Sheets

VIBRATION TYPE TILTING DEVICE

CROSS-REFERENCE TO RELATED APPLICATIONS

This application claims the benefit of Korean Patent Application No. 2005-55027 filed with the Korea Industrial Property Office on Jun. 24, 2005, the disclosure of which is incorporated herein by reference.

BACKGROUND

1. Technical Field

The present invention relates to a tilting device, and in particular, to a vibration type tilting device in which the mass moment of inertia is decreased for superior vibration performance.

2. Description of the Related Art

An image projection device using digital light processing (DLP), in which the mosaic phenomenon in pixels, a problem in regular liquid crystal display (LCD) imaging devices, is eliminated to improve the ability to reproduce original colors, is used widely in theaters, conference rooms, and projection TV's, etc. The image projection device can be divided into a Front Projection device and a Rear Projection device according to the projection method.

The Front Projection device adopts the method of projecting image signals from the front, and is generally used in theaters, conference rooms, etc. On the other hand, the Rear Projection device adopts the method of projecting image signals from the rear of the screen. The Rear Projection device is commonly used in the form of projection TV's. In particular, Rear Projection devices are used more often than Front Projection devices, because of its ability to display a relatively bright image even in a bright environment.

FIG. 1 is a perspective view illustrating a conventional image projection device, and FIG. 2 is a schematic drawing illustrating the pixel structure shown on a screen by a conventional image projection device.

As shown in FIG. 1, a conventional image projection device comprises a lamp 11, a condenser lens 13 which collimates and irradiates light emitted from the lamp 11, a color wheel 15 which separates the collimated white light into red (R), green (G), and blue (B) colors and illuminates ⅓ for every frame, a collimation lens 17 which irradiates parallel the light emitted from the color wheel 15 for each color, a digital micro-mirror panel 19 (hereafter referred to as "DMD") which adjusts the reflection angle for each pixel of the light collimated from the collimation lens 97 for each color to form a picture, and a projection lens 21 which projects the light from the DMD to a large display of a screen S.

On the DMD 19 are formed numerous micro-mirrors (not shown), which are minute in size and are associated with a pixel structure on a silicon wafer, and these micro-mirrors convert the path of the incident light on/off by individually undergoing a highly rapid tilting motion according to the digital information provided to the DMD 19 by a controller. The pixels controlled individually by the DMD 19 are magnified through a projection lens 21 so that a large display picture is formed on the screen S.

As described above, since conventional image projection devices form a large display simply through the magnified projection of the small original picture, there is the problem that the picture quality is degraded due to the grid pattern formed between each pixel P, as seen in FIG. 2. Also, there is a problem in that when the picture moves rapidly or where the line of sight of the viewer moves rapidly, the picture is formed on the screen with rainbow colors showing where the contrast ratio is great, for example where there are black stripes on a white background, or with the grid pattern between each pixel notably significant.

SUMMARY

One aspect of the present invention provides a vibration type tilting device, which provides a smooth and natural display by periodically tilting light reflected from a digital micro-mirror panel in constant intervals and reflecting it onto a screen.

Another aspect of the invention provides a vibration type tilting device in which the mass moment of inertia is decreased to reduce rising time or overshoot.

Additional aspects and advantages of the present invention will be set forth in part in the description which follows and, in part, will be obvious from the description, or may be learned by practice of the invention.

A vibration type tilting device according to an embodiment of the invention may comprise a mirror positioned on a light path which reflects light transmitted from a digital micro-mirror panel, a mirror holder having the mirror joined to a side thereof, a coil joined to the reverse side of the mirror holder, and a magnet which generates a magnetic field passing through the coil, where portions of the mirror holder are removed to decrease the mass moment of inertia of the mirror holder.

A vibration type tilting device based on the present invention may provide a clearer and smoother display by periodically reflecting with a mirror the light reflected from a digital micro-mirror panel in constant time intervals.

It is preferable that portions of the mirror holder be removed to decrease the mass moment of inertia. For example, the mirror holder may be formed in a cross shape, or a plurality of through-holes may be perforated in predetermined positions of the mirror holder. Also, it may be preferable for the mirror holder to be made of aluminum, which has a light mass and relatively high rigidity. By thus decreasing the mass moment of inertia of the mirror holder, the rising time or overshoot may be reduced for a tilting device based on the present invention.

A vibration type tilting device according to another embodiment of the invention may comprise a mirror positioned on a light path which reflects light transmitted from a digital micro-mirror panel, a mirror holder having the mirror joined to a side thereof, a coil joined to the reverse side of the mirror holder, and a magnet which generates a magnetic field passing through the coil, where the mirror holder may preferably be formed from a resin having a deformation temperature of 150° C. or higher and a fatigue limit of 12 MPa or higher.

Since the mirror holder operates in a high temperature and high fatigue stress environment, it may be preferable to have a deformation temperature of 150° C. or higher, which is the typical operation temperature in DLP (digital light processing), and a fatigue limit of 12 MPa or higher at $10^{10}$ cycles, which can be considered to be infinite durability.

The mirror holder may comprise a fixation part, a bending part extended from the fixation part, and a mirror support part supporting the mirror. An electromagnetic force of the coil may be applied to vibrate the mirror support part of the mirror holder by means of the bending of the bending part.

Forming the mirror holder from plastic may not only decrease the mass moment of inertia of the mirror holder and allow easy manufacture, but may also create vibration with a small force, because the Young's modulus is low compared to metal.

Preferably, a mirror holder made of plastic should have portions removed to decrease the mass moment of inertia. For example, the mirror holder may be formed in a cross shape, or a plurality of through-holes may be perforated in predetermined positions of the mirror holder.

A vibration type tilting device according to another embodiment of the invention may comprise a core positioned with a particular amount of displacement from the mirror holder and having a portion thereof positioned inside the coil, and a yoke positioned with a particular amount of displacement from the mirror holder and facing the perimeter of the coil, where the magnet may be positioned between the core and the yoke to magnetize the core and the yoke.

In a vibration type tilting device comprised as above, the magnetic efficiency may be improved by the core and the yoke.

DETAILED DESCRIPTION

Hereinafter, embodiments of the invention will be described in more detail with reference to the accompanying drawings. In the description with reference to the accompanying drawings, those components are rendered the same reference number that are the same or are in correspondence regardless of the figure number, and redundant explanations are omitted.

Figure 3:
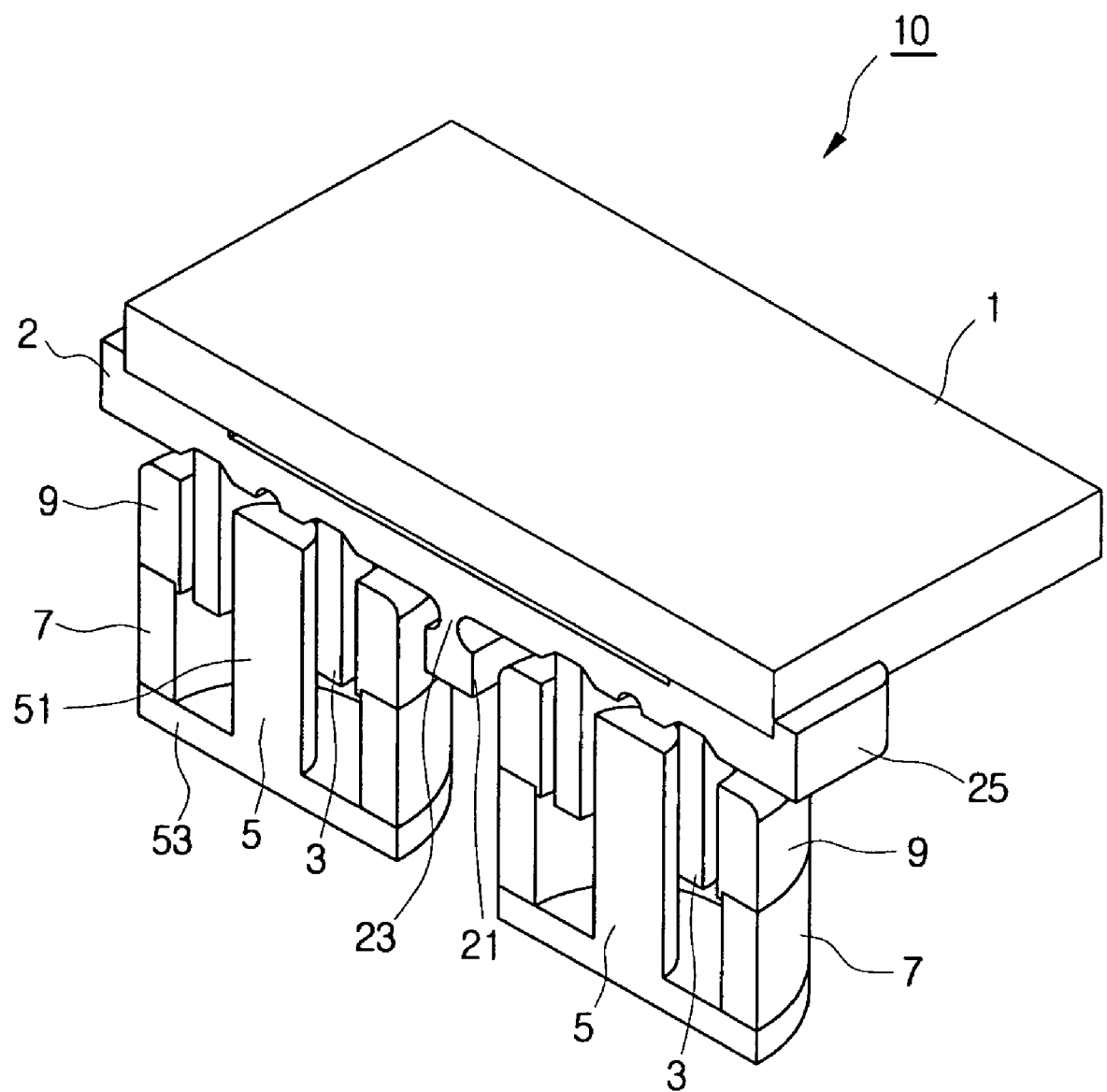
FIG. 3 is a perspective view of a vibration type tilting device according to an embodiment of the present invention.

FIG. 3 is a perspective view of a vibration type tilting device according to an embodiment of the present invention. Referring to FIG. 3, a vibration type tilting device based on an embodiment of the invention comprises a mirror 1, mirror holder 2, coil 3, core 5, magnet 7, and yoke 9.

Figure 8:
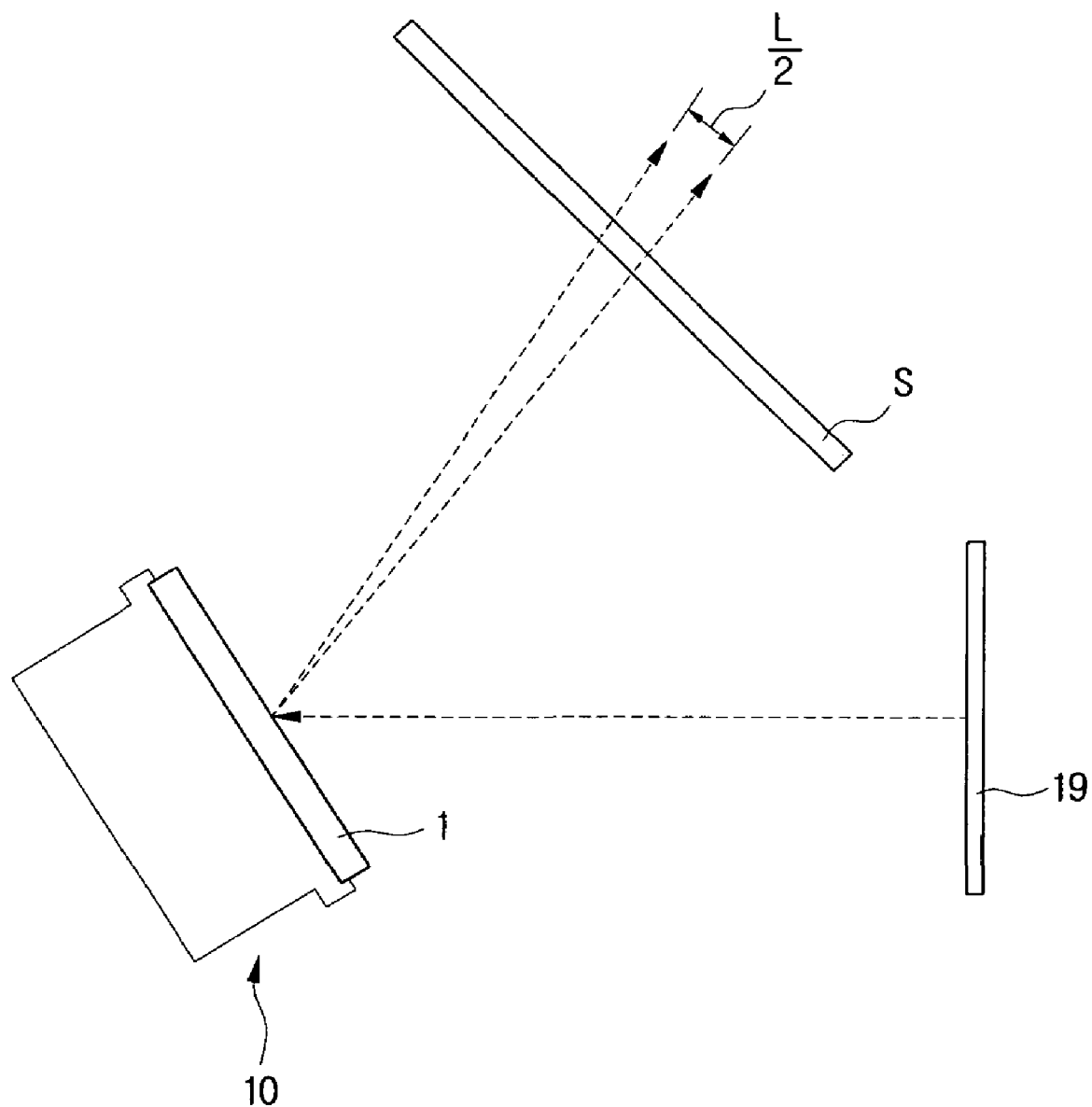
FIG. 8 is a schematic diagram illustrating the tilting action of a vibration type tilting device according to an embodiment of the invention.

The mirror 1 is attached to the upper surface of the mirror holder 2, and is positioned on a light path to periodically reflect the light reflected from a DMD 19 in a particular angle, as illustrated in FIG. 8. The mirror 1 raises the pixels, formed on the screen due to the tilting of light transmitted from the DMD 19, by one half of the vertical distance L between pixels, i.e. L/2. This will be described in more detail below. Typical glass is used for the mirror 1. The mirror 1 may be of any shape, as long as it can reflect the light reflected from the DMD 19 onto the screen S.

The coil 3 is attached to the reverse side of the mirror holder 2 in bilateral symmetry. A portion of the core 5 is inserted through the inside of the coil 3. Also, the coil 3 is surrounded by the yoke 9. The magnetic field, generated by the magnetized core 5 and yoke 9, passes through the coil 3. Therefore, when an electric current is supplied to the coil 3, a force is applied on the coil 3 according to Fleming's Left Hand Rule. This force allows the coil 3, together with the joined mirror 1 and mirror holder 2, to vibrate. Preferably, the coil 3 is formed in bilateral symmetry about the center of vibration, so that the same amount of force is applied to both the left and right sides of the mirror holder 2.

As illustrated in FIG. 3, a portion of the core 5 is positioned inside the coil 3. The core 5 is displaced from the mirror holder 2 by a particular amount and secured to the bottom of the tilting device. The core 5 touches the magnet 7 to be magnetized into an N-pole or an S-pole.

The magnet 7 is separated from the mirror holder 2 and is in contact with the core 5 and the yoke 9. The magnet 7 magnetizes the core 5 and yoke 9 into N-/S-poles. Thus, the magnetized core 5 and yoke 9 create an effect similar to extending the magnet 7, by which a magnetic field is generated that passes through the coil 5. The magnet 7 is formed from a permanent magnet.

The yoke 9 is positioned at the upper portion of the magnet 7 and surrounds the core 5. Thus, the yoke 9 is magnetized by the magnet 7, and together with the core 5 forms a magnetic field. The shape of the yoke 9 is not limited to a cylinder, and may be of any form, such as a quadrilateral, etc., which surrounds the core 5.

The mirror holder 2 comprises a mirror support part 25 which supports the mirror 1, a fixation part 21 which acts as the center of vibration for the mirror holder 2, and a bending part 23 which connects the fixation part 21 and the mirror support part 25.

The fixation part 21 has one end secured, and supports the vibration of the mirror holder 2. The bending part 23 bends when an electromagnetic force is applied on the reverse side of the mirror support part 25, by which the mirror support part 25 is made to vibrate. Thus, the coefficient of elasticity of the entire mirror holder 2 is determined by the shape and material of the bending part 25. The coil 3 is joined to the reverse side of the mirror support part 25, and the coil 3 supplies an electromagnetic force to the mirror support part 25.

The angle by which the mirror holder 2 vibrates depends on the size of the screen, etc., and is generally about 0.015°. The mirror holder 2 vibrates together with the mirror 1, and to reduce the rising time and overshoot, it is desirable that the mass moment of inertia of the mirror holder 2 be decreased as much as possible.

Figure 4:
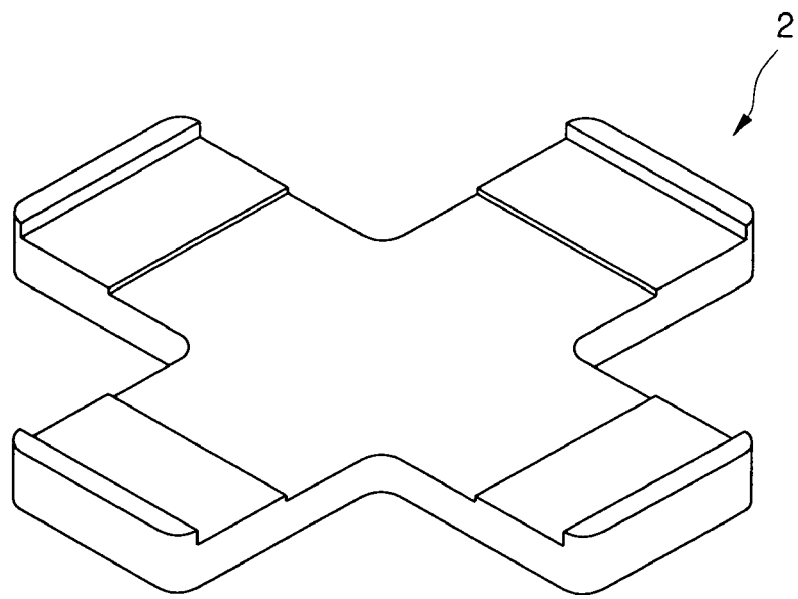
FIG. 4 is a perspective view of the mirror holder, with portions thereof removed, of a vibration type tilting device according to an embodiment of the present invention.

FIG. 4 is a perspective view of the mirror holder 2, with portions thereof removed, of a vibration type tilting device according to an embodiment of the present invention. To decrease the mass moment of inertia of the mirror holder 2, it is desirable to decrease the mass of the portions far apart from the center 2a of vibration. In the present embodiment, the mirror holder 2 is formed in the shape of a cross. Of course, the shape of the mirror holder 2 is not thus limited, and any shape may be used which can support the mirror 1 while decreasing the moment of inertia.

Figure 5:
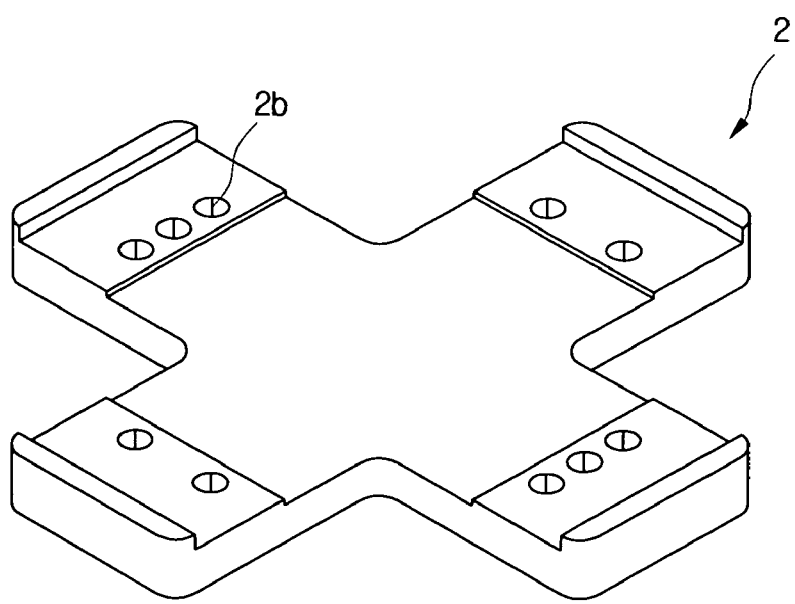
FIG. 5 is a perspective view of the mirror holder, with a plurality of through-holes perforated, of a vibration type tilting device according to an embodiment of the present invention.

FIG. 5 is a perspective view of the mirror holder 2, with a plurality of through-holes perforated, of a vibration type tilting device according to an embodiment of the present invention. To decrease the mass moment of inertia of the mirror holder 2, a plurality of through-holes are formed on the edges of the mirror holder 2 in bilateral symmetry.

In decreasing the mass moment of inertia of the mirror holder 2, the mass of the mirror holder 2 itself may also be decreased. For example, the mirror holder 2 may be formed from aluminum, which has a low specific gravity and light weight. Aluminum has a specific gravity of 2.7 and is much lighter than steel (7.8), so that the mass moment of inertia of the mirror holder may be reduced.

The mirror holder 2 may also be formed from plastic. Plastic has a specific gravity lower than metal, so that the mass moment of inertia may be reduced. In addition, manufacturing the mirror holder 2 from metal incurs high production costs due to the use of casting, whereas using plastic allows reduced production costs as the manufacture may be performed by injection molding. Since plastic has a lower coefficient of elasticity than that of metal, for the vibration axis 2a to have the same spring coefficient, the vibration axis 2a must have a greater thickness. Thus, since the thickness of the vibration axis 2a may be greater, the fabrication is made easier. As the mirror holder 2 is positioned on the light path, to endure the high temperatures (generally of 150° C.) caused by the light source, a deformation temperature of 150° C. or higher is preferable. Also, since the mirror holder 2 vibrates periodically in a very high speed, fatigue stresses are concentrated on the vibration axis 2a. Thus, it is preferable that the mirror holder 2 be formed using a material that has superb bending strength and elasticity.

Figure 6:
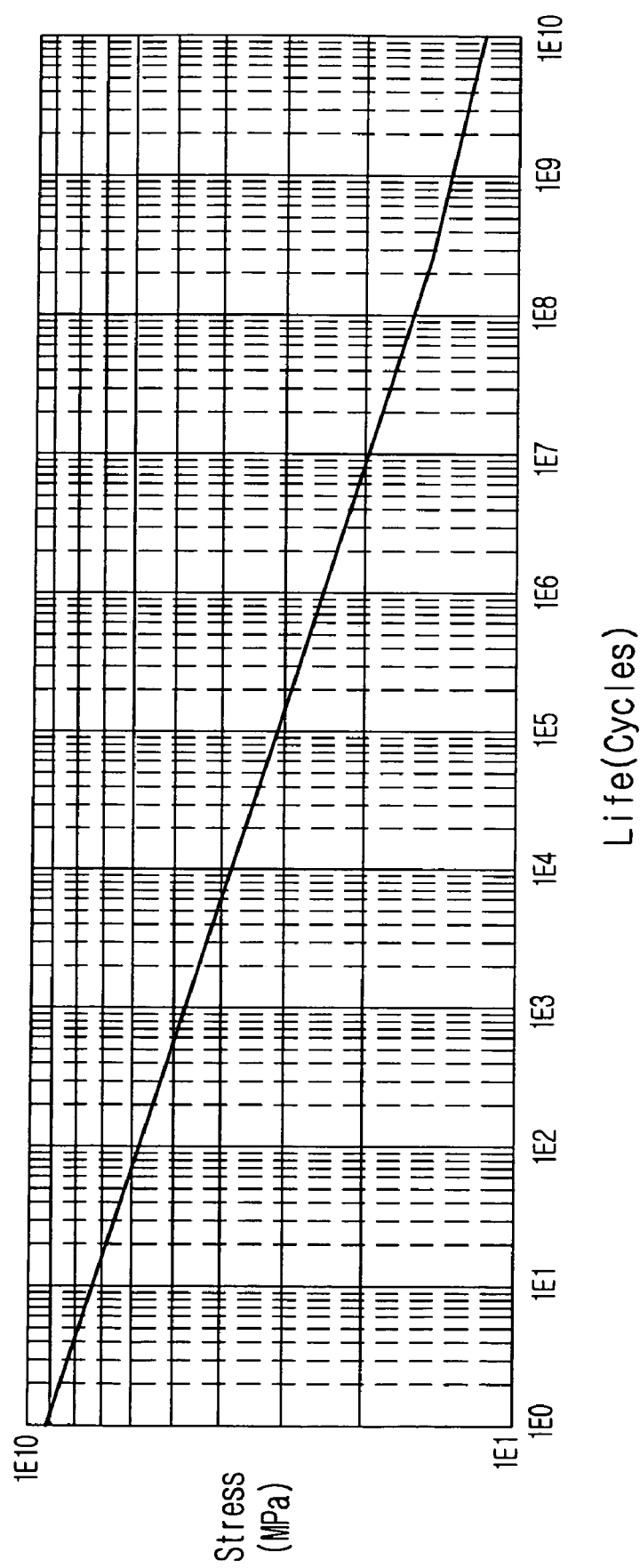
FIG. 6 is a S-N graph illustrating the fatigue limit when the mirror holder is manufactured from polyphenylene sulfide.

FIG. 6 shows a S-N curve (stress-cycle curve) representing the fatigue limit when the mirror holder 2 is manufactured from polyphenylene sulfide, a typical industrial plastic. In FIG. 6, the horizontal axis is the number of cycles of the mirror holder 2 and the vertical axis is the fatigue limit (MPa), each represented in logarithm scale. As shown in FIG. 6, a fatigue limit of 12 MPa or higher at $10^{10}$ cycles, which can be considered to be infinite durability, is preferable for the mirror holder 2.

Since the mirror holder 2 vibrates in extremely minute angles, precision manufacturing is required. Therefore, it is preferable that the mirror holder 2 be formed of a material having superb precision moldability. In particular, a material which allows precision manufacturing in lathing, drilling, grinding, and sawing, etc., is preferable.

Figure 7:
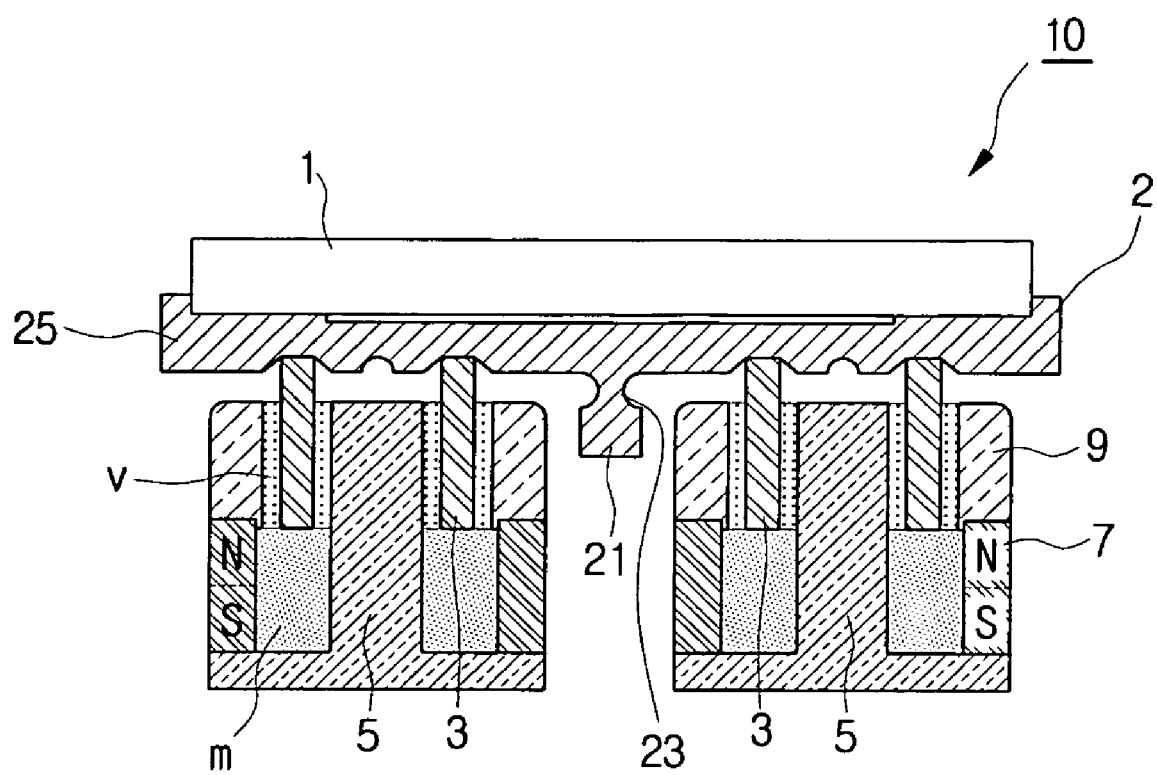
FIG. 7 is a cross-sectional view illustrating the operation of a vibration type tilting device according to an embodiment of the present invention.

FIG. 7 is a cross-sectional view illustrating the operation of a vibration type tilting device according to an embodiment of the present invention.

The N-pole of the magnet 7 is in contact with the yoke 9, while the S-pole is in contact with the core 5. Thus, as the yoke 9 is magnetized into an N-pole, and the core 5 is magnetized into an S-pole by the magnet 7, a magnetic field is formed in directions from the yoke 9 towards the core 5. As the coil 3 is positioned between the core 5 and the yoke 9, the magnetic field passes through the coil 3. Therefore, when an electric current is supplied to the coil 3, a force is applied on the coil 3, according to Fleming's Left Hand Rule. Changing the intensity and direction of the electric current supplied to the coil 3 changes the force applied on the coil 3 and causes the coil 3 to vibrate. Also, the mirror holder 2 and mirror 1 connected to the coil 3 vibrate in constant intervals to tilt the light reflected from the DMD.

Figure 9:
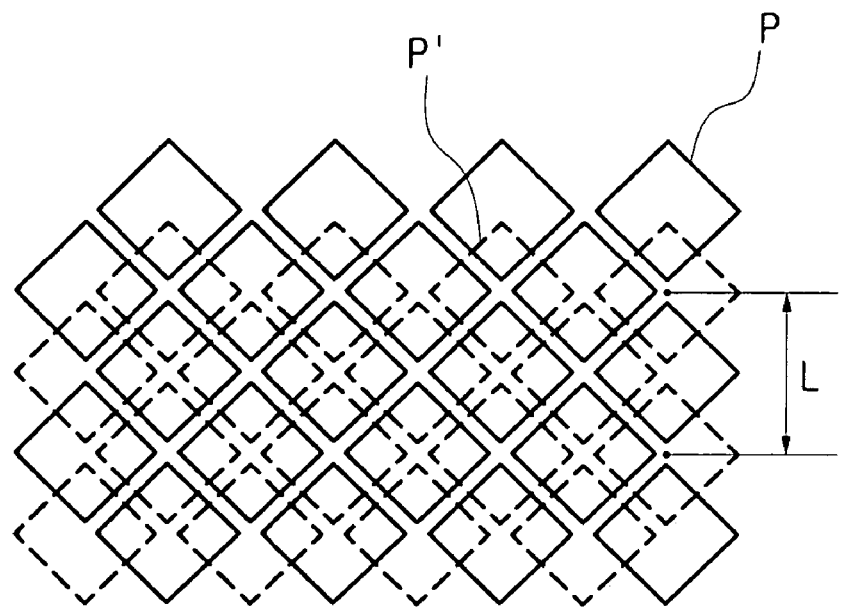
FIG. 9 is a schematic diagram illustrating the pixel structure shown on a screen by a vibration type tilting device according to an embodiment of the invention.

FIG. 8 is a schematic diagram illustrating the tilting action of a vibration type tilting device according to an embodiment of the invention, and FIG. 9 is a schematic diagram illustrating the pixel structure shown on a screen by a vibration type tilting device according to an embodiment of the invention.

The light reflected from a DMD 19 is transmitted to the mirror 1 of a vibration type tilting device based on the present invention. Here, the mirror 1 vibrates together with the mirror holder 2 and tilts the incident light in constant time intervals, as shown in FIG. 8. The speed of the tilting is generally 60 Hz, and may be varied as needed.

Figure 1:
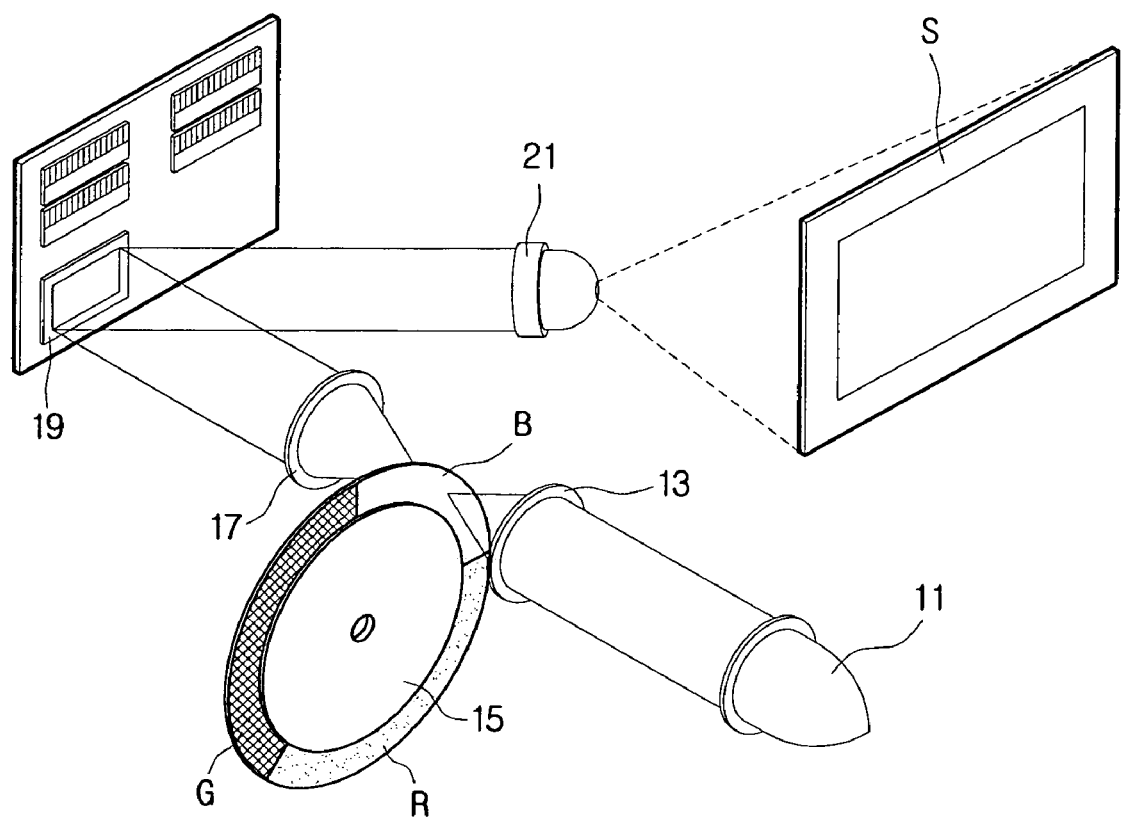
FIG. 1 is a schematic diagram of a conventional image projection device.
Figure 2:
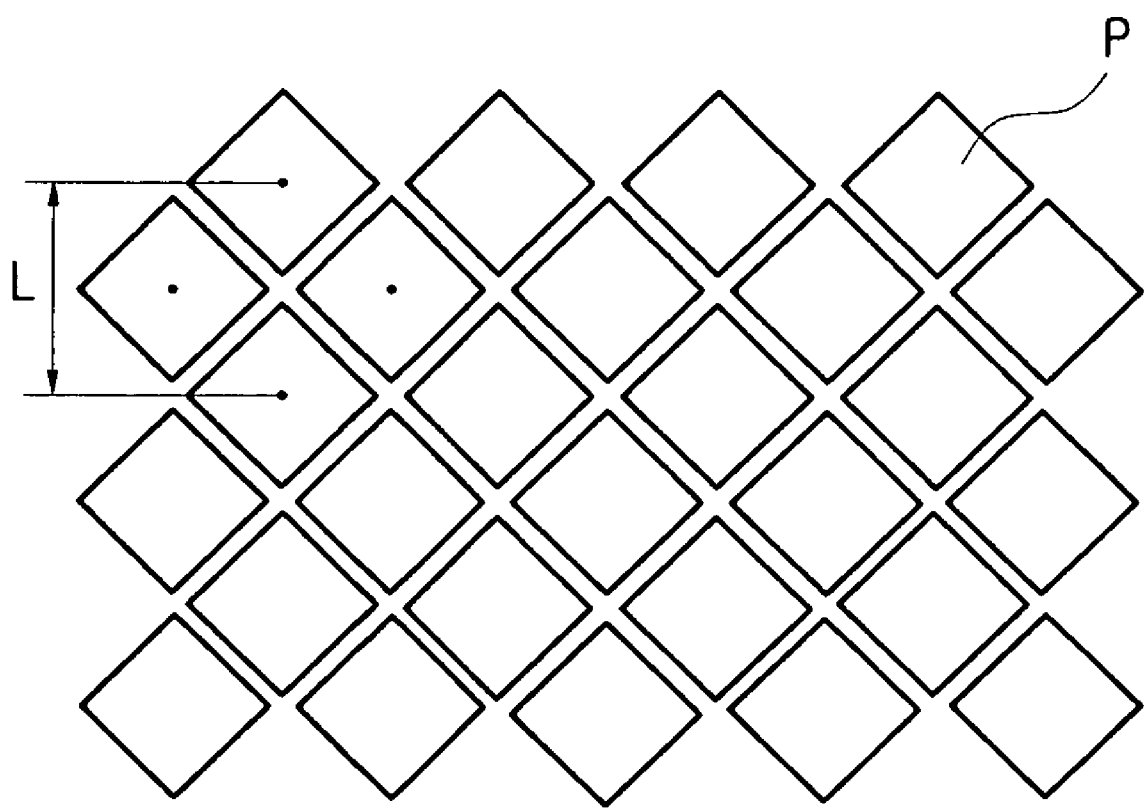
FIG. 2 is a schematic diagram illustrating the pixel structure shown on a screen by a conventional image projection device.

When the light transmitted from the DMD 19 is reflected by the mirror 1, an array of pixels P such as shown in FIG. 2 is formed on the screen S. In FIG. 2, the vertical distance between each pixel is L. When the mirror 1 rotates by about 0.015° due to the vibration of the tilting device 10, the light is tilted by 0.015° to form an array of pixels P' raised on the screen S by L/2, as illustrated in FIG. 7. As described above, the vibration speed of the tilting device 10 is very fast, such as 60 Hz, so that the tilted pixels P' are perceived as being continuously displayed on the screen due to a visual afterimage effect. Therefore, by removing the gap between pixels P using the tilted pixels P', a natural and smooth image may be generated. Also, as the display is clearer, a viewer would not easily have tired eyes even with long hours of viewing.

Figure 10:
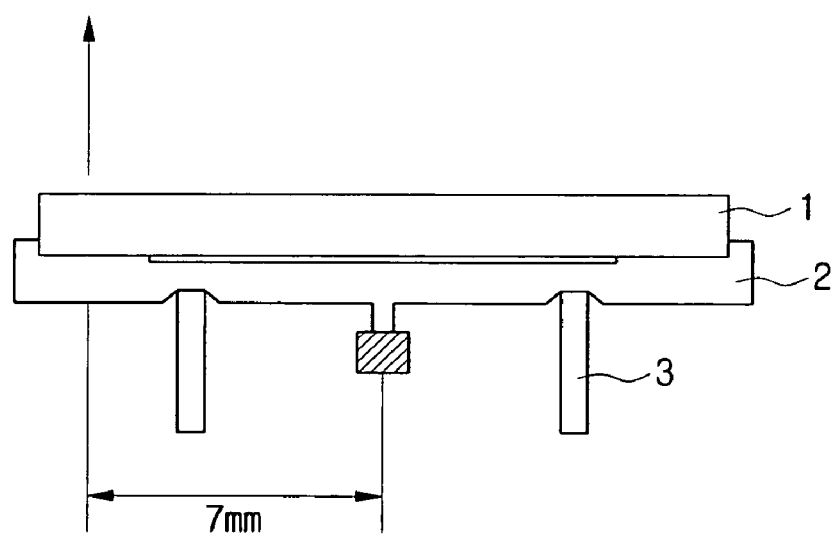
FIG. 10 is a schematic diagram illustrating a mirror, mirror holder, and coil, for testing the vibration performance of a tilting device with respect to changes in the mass moment of inertia of the mirror holder.

FIG. 10 is a schematic diagram illustrating a mirror 1, mirror holder 2, and coil 3, for testing the vibration performance of a tilting device with respect to changes in the mass moment of inertia of the mirror holder. In the experiment, the vibration distance was measured of a point 7 mm away from the center of the mirror 1 using a vibrometer, as illustrated in FIG. 10. Also, the overall damping coefficient c (Nms) and spring coefficient k (N/m) of the mirror 1, mirror holder 2, and coil 3 are kept the same.

EXPERIMENTAL EXAMPLE

The mirror holder 2 had portions thereof removed, as illustrated in FIG. 4, and was formed in a cross shape, to decrease the mass moment of inertia of the mirror holder 2. Aluminum was used as the material of the mirror holder 2. The overall damping coefficient was c=0.007 (Nms), and the spring coefficient was k=38.248434 (N/m) for the mirror 1, mirror holder 2, and coil 3, with the respective mass and mass moment of inertia set as shown in Table 1 below.

TABLE 1 material, mass, and mass moment of inertia of the mirror, mirror holder, and coil

|  | material | mass (kg) | mass moment of inertia (kgmm$^2$) |
|---|---|---|---|
| mirror | glass | 0.006473 | 0.583804 |
| mirror holder | aluminum | 0.002005 | 0.112866 |
| coil | copper | 0.002577 | 0.188129 |
| Total |  | 0.011055 | 0.884799 |

COMPARATIVE EXAMPLE

The mirror holder 2 did not have portions thereof removed, and was formed in a quadrilateral shape, identical to the shape of the mirror 1. Also, steel was used as its material. The overall damping coefficient was c=0.007 (Nms), and the spring coefficient was k=38.25 (N/m) for the mirror 1, mirror holder 2, and coil 3, with the respective mass and mass moment of inertia set as shown in Table 2 below.

TABLE 2

Material, mass, and mass moment of inertia of the mirror, mirror holder, and coil

|  | material | mass (kg) | mass moment of inertia (kgmm$^2$) |
|---|---|---|---|
| mirror | glass | 0.006473 | 0.053804 |
| mirror holder | steel and aluminum | 0.029557 | 7.701250 |
| coil | copper | 0.002577 | 0.188129 |
| Total |  | 0.038607 | 7.943183 |

EXPERIMENT RESULTS

Figure 11A:
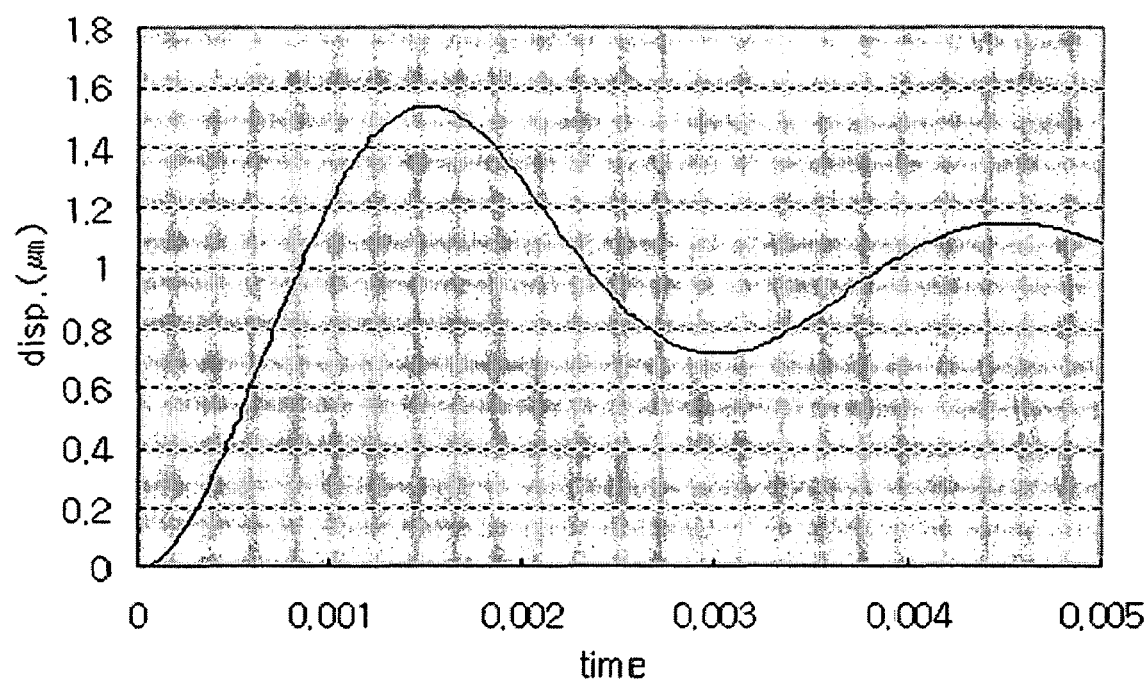
FIG. 11a is a graph illustrating the displacement of the mirror holder with respect to time, of which the mass moment of inertia is not decreased.
Figure 11B:
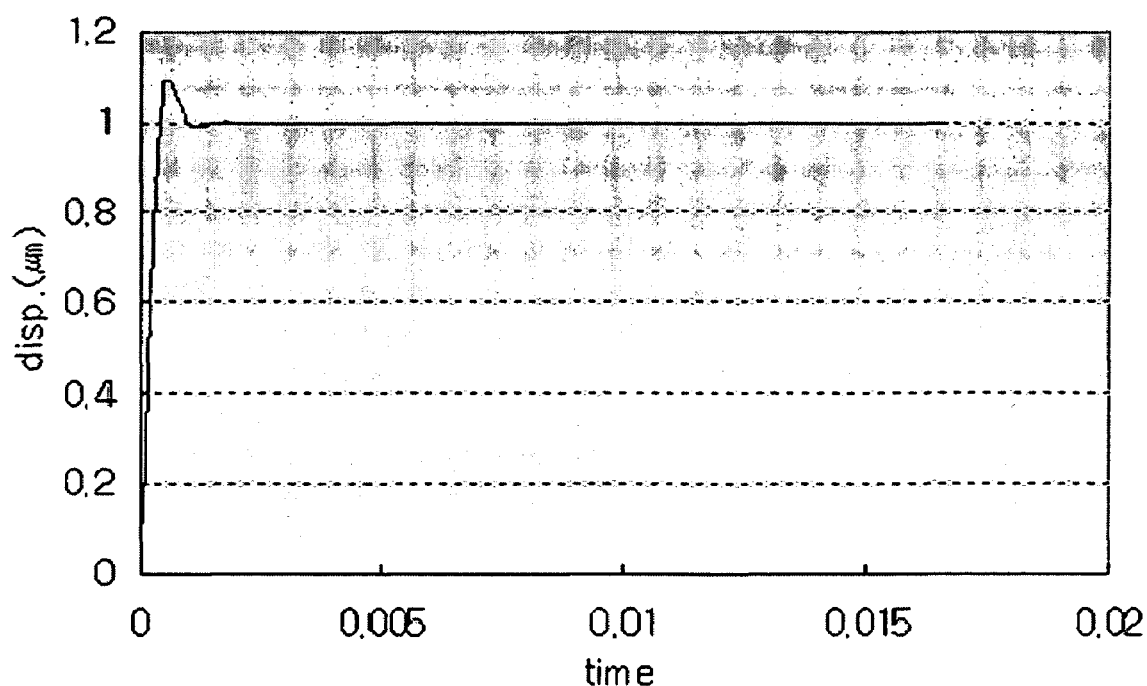
FIG. 11b is a graph illustrating the displacement of the mirror holder with respect to time, of which the mass moment of inertia is decreased.

As seen in Tables 1 and 2, the Experimental Example shows significantly reduce mass and mass moment of inertia, compared to the Comparative Example. The displacement curves of the mirror 1 and mirror holder 2 with respect to time are shown in FIGS. 11a and 11b. FIG. 11a is a graph representing the displacement curve of the Comparative Example, and FIG. 11b is a graph representing the displacement curve of the Experimental Example. The rising time and overshoot of FIGS. 11a and 11b are shown in Table 3 below.

TABLE 3

Comparison of Rising Time and Overshoot between Comparative Example and Experimental Example

|  | Rising Time | Overshoot |
|---|---|---|
| Comparative Example | 0.84 ms | 53.40% |
| Experimental Example | 0.42 ms | 9.40% |

As seen in Table 3, the rising time and overshoot may significantly be reduced by decreasing the mass moment of inertia of the mirror holder. Therefore, a vibration type tilting device based on the present invention allows enhanced tracking ability, due to the reduction in rising time, and allows reduced residual vibration, due to the reduction in overshoot, to provide improved vibration performance.

According to the present invention comprised as above mentioned, a smooth and natural display may be provided by periodically tilting light reflected from a digital micro-mirror panel in constant intervals and reflecting it onto a screen.

Also, embodiments of the invention may reduce the rising time and overshoot to reduce residual vibration of the mirror, by decreasing the mass moment of inertia of the tilting device, and may provide a vibration type tilting device with superior tracking ability.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A vibration type tilting device comprising:
a mirror, positioned on a light path, which reflects light transmitted from a digital micro-mirror panel;
a mirror holder having the mirror joined to a side thereof;
a coil joined to the reverse side of the mirror holder; and
a magnet which generates a magnetic field passing through the coil,
wherein portions of the mirror holder are removed to decrease the mass moment of inertia of the mirror holder, and
wherein a plurality of through-holes are perforated in predetermined positions of the mirror holder.

2. The vibration type tilting device of claim 1, wherein the mirror holder has a cross shape.

3. The vibration type tilting device of claim 1, wherein the mirror holder is made of aluminum.

4. A vibration type tilting device comprising:
a mirror, positioned on a light path, which reflects light transmitted from a digital micro-mirror panel;
a mirror holder having the mirror joined to a side thereof;
a coil joined to the reverse side of the mirror holder; and
a magnet which generates a magnetic field passing through the coil;
wherein the mirror holder is formed from a resin having a deformation temperature of 150° C. or higher and a fatigue limit of 12 MPa or higher.

5. The vibration type tilting device of claim 4, wherein the mirror holder comprises:
a fixation part;
a bending part extended from the fixation part; and
a mirror support part supporting the mirror.

6. The vibration type tilting device of claim 5, wherein an electromagnetic force of the coil is applied to vibrate the mirror support part of the mirror holder by means of the bending of the bending part.

7. The vibration type tilting device of claim 4, wherein portions of the mirror holder are removed.

8. The vibration type tilting device of claim 7, wherein the mirror holder has a cross shape.

9. The vibration type tilting device of claim 4, wherein a plurality of through-holes are perforated in predetermined positions of the mirror holder.

10. The vibration type tilting device according to any one of claims 1 to 2, and 3 to 9, further comprising:
a core positioned with a particular amount of displacement from the mirror holder and having a portion thereof positioned inside the coil; and
a yoke positioned with a particular amount of displacement from the mirror holder and facing the perimeter of the coil;
wherein the magnet is positioned between the core and the yoke and magnetizes the core and the yoke.

* * * * *

UNITED STATES PATENT AND TRADEMARK OFFICE
CERTIFICATE OF CORRECTION

| | | |
|---|---|---|
| PATENT NO. | : 7,396,138 B2 | Page 1 of 1 |
| APPLICATION NO. | : 11/472393 | |
| DATED | : July 8, 2008 | |
| INVENTOR(S) | : Yang-Ho Moon et al. | |

It is certified that error appears in the above-identified patent and that said Letters Patent is hereby corrected as shown below:

Column 8, Line 51, change "1to 2," to --1 to 2,--.

Signed and Sealed this

Fourth Day of November, 2008

JON W. DUDAS
*Director of the United States Patent and Trademark Office*